(12) United States Patent
Benites et al.

(10) Patent No.: US 6,340,198 B1
(45) Date of Patent: Jan. 22, 2002

(54) MULTI-PART AND MULTI-FUNCTION COVER FOR SELECTIVE PORTIONS OF A VEHICLE

(76) Inventors: Graciela Benites; Miguel Carbo, both of P.O. Box 7126, Aurora, IL (US) 60507

( * ) Notice: Subject to any disclaimer, the term of this patent is extended or adjusted under 35 U.S.C. 154(b) by 0 days.

(21) Appl. No.: 09/524,585

(22) Filed: Mar. 13, 2000

(51) Int. Cl.[7] ............................................... B60J 11/00
(52) U.S. Cl. .................................................... 296/136
(58) Field of Search ........................ 296/136, 95.1; 160/370.21, DIG. 2; 135/88.01

(56) References Cited

U.S. PATENT DOCUMENTS

| | | | |
|---|---|---|---|
| 4,294,483 A | * 10/1981 | Ferris | 296/136 |
| 4,612,967 A | 9/1986 | Kamen et al. | 150/52 K |
| 4,799,728 A | * 1/1989 | Akers et al. | 296/136 |
| 4,938,522 A | 7/1990 | Herron et al. | 296/136 |
| 5,161,849 A | 11/1992 | Holland, Jr. | 296/95.1 |
| 5,343,915 A | 9/1994 | Newsome | 150/166 |
| 5,497,819 A | * 3/1996 | Chiang | 296/136 |
| 5,915,399 A | * 6/1999 | Yang | 296/136 |

* cited by examiner

*Primary Examiner*—Joseph D. Pape
*Assistant Examiner*—Jason Morrow
(74) *Attorney, Agent, or Firm*—Richard L. Miller, P.C.

(57) ABSTRACT

A multi-part and multi-function cover for selective portions of a vehicle. The cover includes a cover member that covers the selective portions of the vehicle, fastening apparatus that is associated with the cover member and fastens the cover member on the selective portions of the vehicle, and a bag that stores the cover member when not in use. The cover member includes a lower portion that covers the pair of front fenders of the vehicle, the hood of the vehicle, the at least one door of a the vehicle, the pair of rear quarter panels of the vehicle, and the trunk lid of the vehicle. The cover member further includes an upper portion that is independent from the lower portion of the cover member and covers the roof of the vehicle, the front windshield of the vehicle, the rear windshield of the vehicle and the at least one side window of the vehicle. When the vehicle is a convertible and the roof of the vehicle is down, the upper portion of the cover member also functions as a tonneau cover that protects the interior of the vehicle.

11 Claims, 1 Drawing Sheet

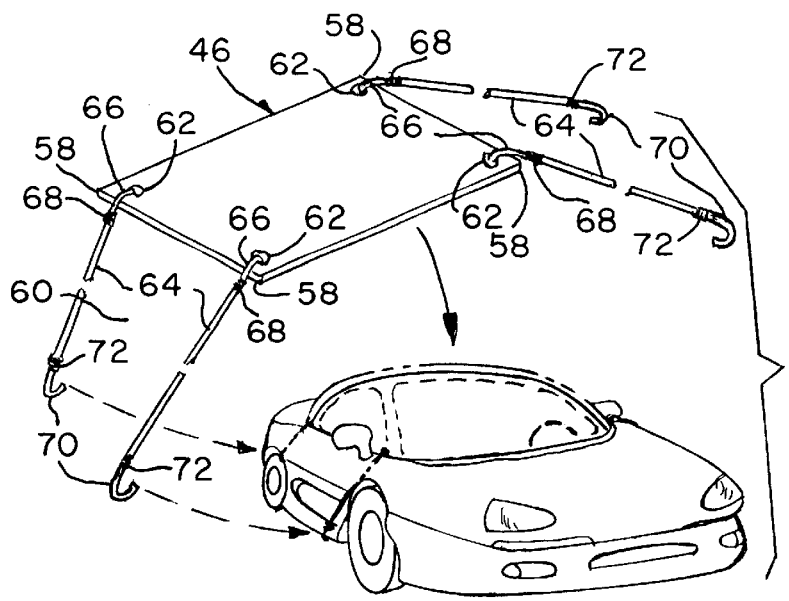
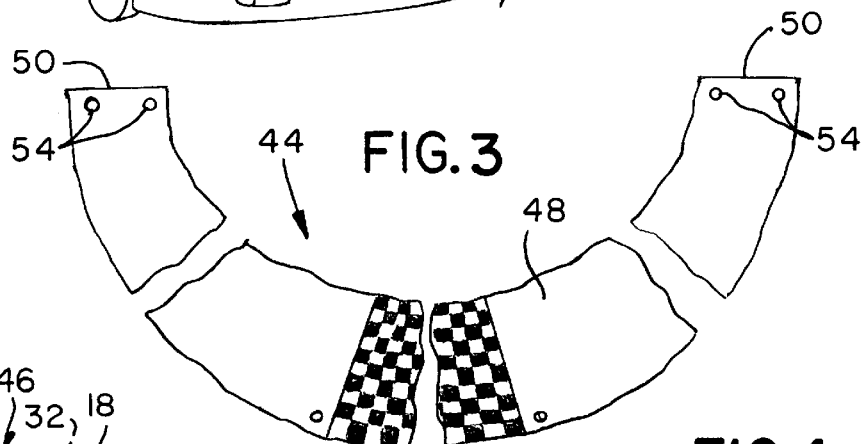
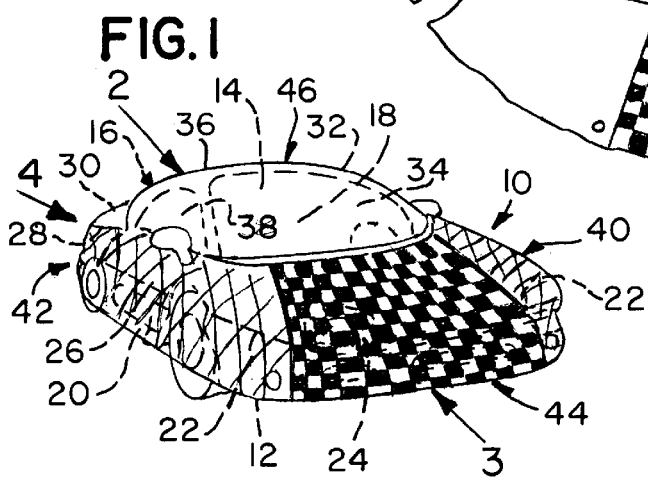
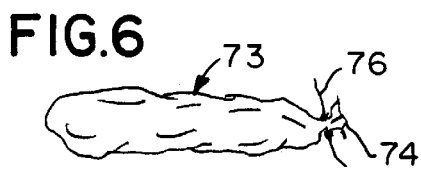
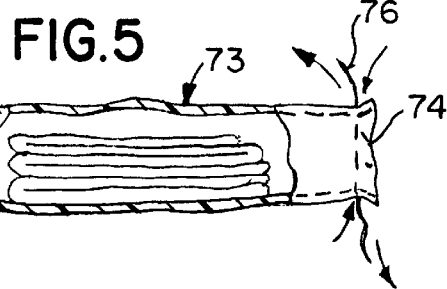

MULTI-PART AND MULTI-FUNCTION COVER FOR SELECTIVE PORTIONS OF A VEHICLE

BACKGROUND OF THE INVENTION

1. Field of the Invention

The present invention relates to a cover for a vehicle. More particularly, the present invention relates to a multi-part: and multi-function cover for selective portions of a vehicle.

2. Description of the Prior Art

Numerous innovations for car covers have been provided in the prior art that will be described. Even though these innovations may be suitable for the specific individual purposes to which they address, however, they differ from the present invention.

A First Example, U.S. Pat. No. 4,612,967 to Kamen et al. teaches a padded car cover apparatus comprising a car cover member comprising an inverted car cover envelope having two side portion and wherein each of the side portions is provided with a padding member, that is removably received in an elongated pocket member.

A Second Example, U.S. Pat. No. 4,938,522 to Herron et al. teaches a protective cover that snugly fits over an automobile having a cleaned polished surface and protects same while the automobile is in the open. The cover includes flared side panels, a bumper panel, hood panel, windshield panel, roof panel, rear window panel and tail panel all connected together by seams and closely fitting the corresponding surfaces of the automobile. In particular the seams are non-coincident with corners of the automobile so that stress on the seams is avoided. Also, the cover has a flap in one side panel, especially on the driver's side which can be opened to permit access to the automobile, in such case windows are included in the cover so that the automobile can be operated with the cover fitted thereon. The cover particularly has a water-proof outer layer and an air permeable, polishing inner layer.

A third Example, U.S. Pat. No. 5,161,849 to Holland, Jr. teaches a flexible protective cover for an automotive vehicle that is provided with an anchorage mechanism that is inserted through a door opening or trunk opening. When the door or trunk lid is closed and locked, the anchorage mechanism is trapped within the vehicle interior space so that it cannot be pulled out to remove the cover from the vehicle. The anchorage mechanism is preferably a hollow air-filled structure having a whistle or siren mounted in such a position that when an external pulling force is exerted on the anchorage mechanism air is forced out of the air-filled structure through the whistle or siren, thereby producing an audible alarm signal.

A Fifth Example, U.S. Pat. No. 5,343,915 to Newsome teaches a multi-layer cover for an automobile that has an outer water proof layer, an inner soft layer to protect the finish of the automobile, and a padded middle layer to absorb shock of objects striking the automobile. A securing cable extends under the automobile and is in a channel in or over the cover to secure the cover top the automobile and to prevent intruders from opening the doors of the automobile during storage. A flap over at least one door may be opened by the owner to enter the automobile while the cover is in place over the automobile. A cover flap protects fasteners securing the door flap. A cable is connected to two eyelets to prevent opening the flap and door flap.

It is apparent that numerous innovations for car covers have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

Accordingly, an object of the present invention is to provide a multi-part and multi-function cover for selective portions of a vehicle that avoids the disadvantages of the prior art.

Another object of the present invention is to provide a multi-part and multi-function cover for selective portions of a vehicle that is simple and inexpensive to manufacture.

Still another object of the present invention is to provide a multi-part and multi-function cover for selective portions of a vehicle that is simple to use.

Briefly Stated, another object of the present invention is to provide a multi-part and multi-function cover for selective portions of a vehicle. The cover includes a cover member that covers the selective portions of the vehicle, fastening apparatus that is associated with the cover member and fastens the cover member on the selective portions of the vehicle, and a bag that stores the cover member when not in use. The cover member includes a lower portion that covers the pair of front fenders of the vehicle, the hood of the vehicle, the at least one door of the vehicle, the pair of rear quarter panels of the vehicle, and the trunk lid of the vehicle. The cover member further includes an upper portion that is independent from the lower portion of the cover member and covers the roof of the vehicle, the front windshield of the vehicle, the rear windshield of the vehicle, and the at least one side window of the vehicle. When the vehicle is a convertible and the roof of the vehicle is down, the upper portion of the cover member also functions as a tonneau cover that protects the interior of the vehicle.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a diagrammatic perspective view of the present invention in use;

FIG. 2 is an exploded perspective view of the portion indicated by arrow 2 in FIG. 1 of the upper portion of the present invention;

FIG. 3 is an enlarged top plan view of the portion indicated by arrow 3 in FIG. 1 of the lower portion of the present invention;

FIG. 4 is a fragmented diagrammatic elevational view taken generally in the direction of arrow 4 in FIG. 1 of the fastening apparatus for the lower portion of the present invention shown in FIG. 3;

FIG. 5 is a breakaway diagrammatic side elevational view of the present invention in the process of being stored in a bag; and FIG. 6 is a diagrammatic side elevational view of the present invention stored in the bag of FIG. 5.

LIST OF REFERENCE NUMERALS UTILIZED IN THE DRAWING 10 multi-part and multi-function cover of present invention for selective portions 12 and 14 of vehicle 16
12 one portion of selective portions 12 and 14 of vehicle 16
14 other portion of selective portions 12 and 14 of vehicle 16
16 vehicle
18 interior of vehicle 16
20 pair of rocker panels of vehicle 16
22 pair of front fenders of vehicle 16
24 hood of vehicle 16
26 at least one door of vehicle 16
28 pair of rear quarter panels of vehicle 16
30 trunk lid of vehicle 16
32 roof of vehicle 16
34 front windshield of vehicle 16
36 rear windshield of vehicle 16
38 at least one side window of vehicle 16
40 cover member for covering selective portions 12 and 14 of vehicle 16
42 fastening apparatus for fastening cover member 40 on selective portions 12 and 14 of vehicle 16
44 lower portion of cover member 40 for covering pair of front fenders 22 of vehicle 16, hood 24 of vehicle 16, at least one door 26 of vehicle 16, pair of rear quarter panels 28 of vehicle 16, and trunk lid 30 of vehicle 16
46 upper portion of cover member 40 for covering roof 32 of vehicle 16, front windshield 34 of vehicle 16, rear windshield 36 of vehicle 16, and at least one side window 38 of vehicle 16
48 body of lower portion 44 of cover member 40 for covering hood 24 of vehicle 16, pair of front fenders 22 of vehicle 16, at least one door 26 of vehicle 16, and pair of rear quarter panels 28 of vehicle 16
50 pair of ends of lower portion 44 of cover member 40 for covering trunk lid 30 of vehicle 16
52 lower portion fastening apparatus of fastening apparatus 42 for releasably fastening lower portion 44 of cover member 40 onto hood 24 of vehicle 16, pair of front fenders 22 of vehicle 16, at least one door 26 of vehicle 16, pair of rear quarter panels 28 of vehicle 16, and trunk lid 30 of vehicle 16.
54 plurality of corresponding throughbores of lower portion fastening apparatus 52 of fastening apparatus 42 in pair of ends 50 of lower portion 44 of cover member 40
56 plurality of ties of lower portion fastening apparatus 52 of fastening apparatus 42
58 four corners of upper portion 46 of cover member 40
60 upper portion fastening apparatus of fastening apparatus 42 for releasably fastening upper portion 46 of cover member 40 onto roof 32 of vehicle 16, front windshield 34 of vehicle 16, rear windshield 36 of vehicle 16, and at least one sides window 38 of vehicle 16
62 throughbore of upper portion fastening apparatus 60 of fastening apparatus 42 in each corner of four corners 58 of upper portion 46 of cover member 40
64 plurality of bungee cords of upper portion fastening apparatus 60 of fastening apparatus 40
66 hook of upper portion fastening apparatus 60 of fastening apparatus 40 on one end 68 of each bungee cord of plurality of bungee cords 64 of upper portion fastening apparatus 60 of fastening apparatus 40
68 one end 68 of each bungee cord of plurality of bungee cords 64 of upper portion fastening apparatus 60 of fastening apparatus 40
70 another hook of upper portion fastening apparatus 60 of fastening apparatus 40 on other end 72 of each bungee cord of plurality of bungee cords 64 of upper portion fastening apparatus 60 of fastening apparatus 40 for engaging pair of rocker panels 20 of vehicle 16
72 other end of each bungee cord of plurality of bungee cords 64 of upper portion fastening apparatus 60 of fastening apparatus 40
73 bag
74 opening in bag 73
76 pull cord of bag 72

DETAILED DESCRIPTION OF THE PREFERRED EMBODIMENT

Referring now to the figures, in which like numerals indicate like parts, and particularly to FIG. 1, the multi-part and multi-function cover of the present invention is shown generally at 10 for selective portions 12 and 14 of a vehicle 16.

The vehicle 16 has an interior 18, a pair of rocker panels 20, a pair of front fenders 22, a hood 24, at least one door 26, a pair of rear quarter panels 28, a trunk lid 30, a roof 32, a front windshield 34, a rear windshield 36, and at least one side window 38.

The overall configuration of the multi-part and multi-function cover 10 can best be seen in FIG. 1, and as such, will be discussed with reference thereto.

The multi-part and multi-function cover 10 comprises a cover member 40 for covering the selective portions 12 and 14 of the vehicle 16, and fastening apparatus 42 that is associated with the cover member 40 for fastening the cover member 40 on the selective portions 12 and 14 of the vehicle 16.

The cover member 40 comprises a lower portion 44 for covering the pair of front fenders 22 of the vehicle 16, the hood 24 of the vehicle 16, the at least one door 26 of the vehicle 16, the pair of rear quarter panels 28 of the vehicle 16, and the trunk lid 30 of the vehicle 16.

The cover member 40 further comprises an upper portion 46 that is independent from the lower portion 44 of the cover member 40 for covering the roof 32 of the vehicle 16, the front windshield 34 of the vehicle 16, the rear windshield 36 of the vehicle 16, and the at least one side window 38 of the vehicle 16.

When the vehicle 16 is a convertible and the roof 32 of the vehicle 16 is down, the upper portion 46 of the cover member 40 also functioning as a tonneau cover for protecting the interior 18 of the vehicle 16.

The lower portion 44 of the cover member 40 and the upper portion 46 of the cover member 40 are each made from a non-abrasive flexible material.

The specific configuration of the lower portion 44 of the cover member 40 can best be seen in FIGS. 3 and 4, and as such, will be discussed with reference thereto.

The lower portion 44 of the cover member 40 is substantially crescent-shaped and has a body 48 for covering the hood 24 of the vehicle 16, the pair of front fenders 22 of the vehicle 16, the at least one door 26 of the vehicle 16, and the pair of rear quarter panels 28 of the vehicle 16.

The lower portion 44 of the cover member 40 further has a pair of ends 50 that taper from the body 48 of the lower portion 44 of the cover member 40 for covering the,trunk lid 30 of the vehicle 16.

The fastening apparatus 42 comprises a lower portion fastening apparatus 52 for releasably fastening the lower portion 44 of the cover member 40 onto the hood 24 of the vehicle 16, the pair of front fenders 22 of the vehicle 16, the at least one door 26 of the vehicle 16, the pair of rear quarter panels 28 of the vehicle 16, and the trunk lid 30 of the vehicle 16.

The lower portion fastening apparatus 52 of the fastening apparatus 42 includes the pair of ends 50 of the lower portion 44 of the cover member 40 having a plurality of corresponding throughbores 54.

The lower portion fastening apparatus 52 of the fastening apparatus 42 further includes a plurality of ties 56 that extend through the plurality of corresponding throughbores 54 in the pair of ends 50 of the lower portion 44 of the cover member 40 and are tied to each other.

The specific configuration of the upper portion 46 of the cover member 40 can best be seen in FIG. 2, and as such, will be discussed with reference thereto.

The upper portion 46 of the cover member 40 is substantially rectangular-shaped and has four corners 58.

The fastening apparatus 42 further comprises an upper portion fastening apparatus 60 for releasably fastening the upper portion 46 of the cover member 40 onto the roof 32 of the vehicle 16, the front windshield 34 of the vehicle 16, the rear windshield 36 of the vehicle 16, and the at least one side window 38 of the vehicle 16.

The upper portion fastening apparatus 60 of the fastening apparatus 42 includes each corner 58 of the upper portion 46 of the cover member 40 having a throughbore 62.

The upper portion fastening apparatus 60 of the fastening apparatus 40 further includes a plurality of bungee cords 64, each of which has a hook 66 on one end 68 thereof that engages in the throughbore 62 in an associated corner 58 of the upper portion 46 of the cover member 40, and another hook 70 on the other end 72 thereof for engaging the pair of rocker panels 20 of the vehicle 16.

As shown in FIGS. 5 and 6, the multi-part and multi-function cover 10 further comprises a bag 73 that releasably stores the cover member 40 when not in use and has an opening 74.

The bag 73 has a pull cord 76 that selectively closes the opening 74 in the bag 73, and maintains the opening 74 in the bag 73 closed, when tied in a knot.

It will be understood that each of the elements described above, or two or more together, may also find a useful application in other types of constructions differing from the types described above.

While the invention has been illustrated and described as embodied in a multi-part and multi-function cover for selective portions of a vehicle, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A multi-part and multi-function cover for selective portions of a vehicle, wherein the vehicle has an interior, a pair of rocker panels, a pair of front fenders, a hood, at least one door, a pair of rear quarter panels, a trunk lid, a roof, a front windshield, a rear windshield, and at least one side window, said cover comprising:

A) a cover member for covering the selective portions of the vehicle; and

B) fastening apparatus associated with said cover member for fastening said cover member on the selective portions of the vehicle, wherein said cover member comprises:
  i) a lower portion for covering the pair of front fenders of the vehicle, the hood of the vehicle, the at least one door of the vehicle, the pair of rear quarter panels of the vehicle, and the trunk lid of the vehicle; and
  ii) an upper portion that is independent from said lower portion of said cover member for covering the roof of the vehicle, the front windshield of the vehicle, the rear windshield of the vehicle, and when the vehicle is a convertible and the roof of the vehicle is down, said upper portion of said cover member also functioning as a tonneau cover for protecting the interior of the vehicle, wherein said lower portion of said cover member is substantially crescent-shaped and has:
    a) a body for covering the hood of the vehicle, the pair of front fenders of the vehicle, the at least one door of the vehicle, and the pair of rear quarter panels of the vehicle; and
    b) a pair of ends that taper from said body of said lower portion of said cover member for covering the trunk lid of the vehicle.

2. The cover as defined in claim 1, wherein said lower portion of said cover member is made from a non-abrasive flexible material.

3. The cover as defined in claim 1, wherein said upper portion of said cover member is made from a non-abrasive flexible material.

4. The cover as defined in claim 1, wherein said fastening apparatus comprises:

a) a lower portion fastening apparatus for releasably fastening said lower portion of said cover member onto the hood of the vehicle, the pair of front fenders of the vehicle, the at least one door of the vehicle, the pair of rear quarter panels of the vehicle, and the trunk lid of the vehicle; and b) an upper portion fastening apparatus for releasably fastening said upper portion of said cover member onto the roof of the vehicle, the front windshield of the vehicle, the rear windshield of the vehicle, and the at least one side window of the vehicle.

5. The cover as defined in claim 4, wherein said lower portion fastening apparatus of said fastening apparatus includes said pair of ends of said lower portion of said cover member having a plurality of corresponding throughbores.

6. The cover as defined in claim 5, wherein said lower portion fastening apparatus of said fastening apparatus further includes a plurality of ties that extend through said plurality of corresponding throughbores in said pair of ends of said lower portion of said cover member and are tied to each other.

7. The cover as defined in claim 4, wherein said upper portion of said cover member is substantially rectangular-shaped and has four corners.

8. The cover as defined in claim 7, wherein said upper portion fastening apparatus of said fastening apparatus includes each corner of said four corners of said upper portion of said cover member having a throughbore.

9. The cover as defined in claim 8, wherein said upper portion fastening apparatus of said fastening apparatus further includes a bungee cord, each of which has:
  a) a hook on one end thereof that engages in said throughbore in an associated corner of said upper portion of said cover member; and
  b) another hook on the other end thereof for engaging the pair of rocker panels of the vehicle.

10. The cover as defined in claim 1, further comprising a bag releasably storing said cover member when not in use and having an opening.

11. The cover as defined in claim 10, wherein said bag has a pull cord that selectively closes said opening in said bag, and maintains said opening in said bag closed, when tied in a knot.

* * * * *